United States Patent Office.

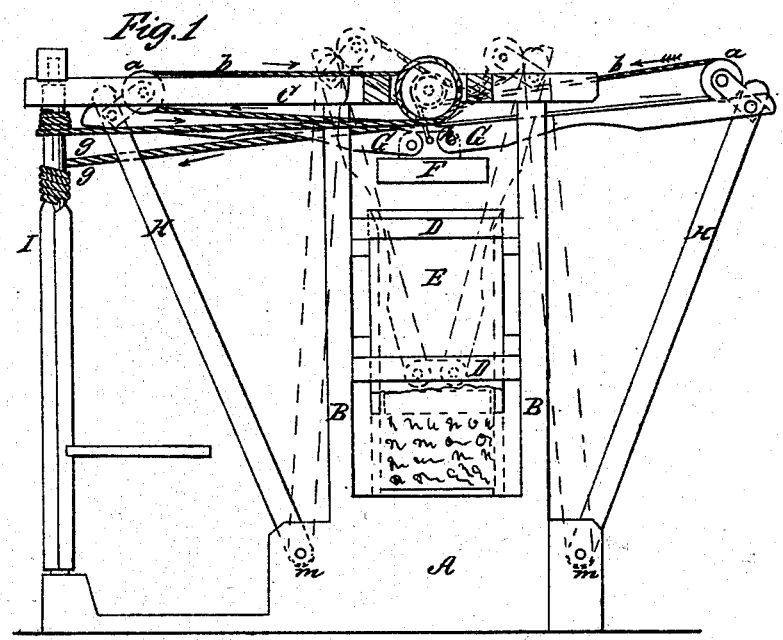
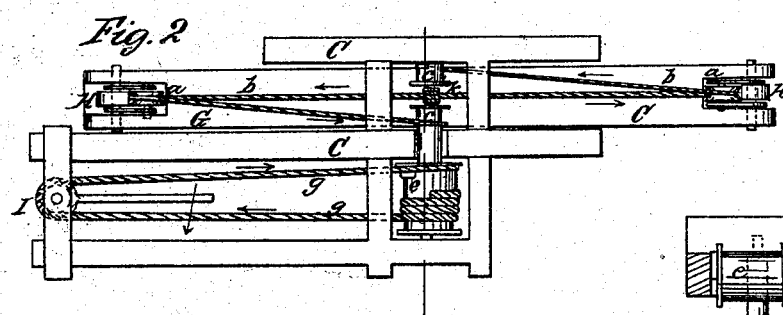
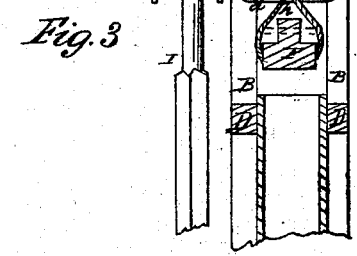

SAMUEL D. ROBERTS, OF WASHINGTON, LOUISIANA.

Letters Patent No. 66,394; dated July 2, 1867.

---

IMPROVEMENT IN COTTON-PRESS.

---

*The Schedule referred to in these Letters Patent and making part of the same.*

---

TO ALL WHOM IT MAY CONCERN:

Be it known that I, SAMUEL D. ROBERTS, of Washington, in the parish of St. Landry, and State of Louisiana, have invented a new and useful Improvement in Cotton-Press; and I do hereby declare that the following is a full, clear, and exact description thereof, which will enable others skilled in the art to make and use the same, reference being had to the accompanying drawings forming part of this specification, in which—

Figure 1 is a side elevation of my invention.

Figure 2 is a top view.

Figure 3 is a vertical cross-section taken in the line $x\ x$, fig. 2.

Similar letters of reference indicate like parts.

This invention relates to an improvement in the construction of a cotton-press, and consists in an arrangement of double levers operated by a capstan connected with drums, ropes, and pulleys which work a single vertical follower-block for compressing cotton in an ordinary packing-box or chest. The plan of construction is very simple, and the press has the advantage of being cheap, portable, and easily operated.

Upon bed-timbers A is erected a perpendicular frame of four standards B, conforming in plan to the shape of a cotton-bale. The posts are connected in pairs by cap timbers C, and intermediate cross-ties D. Within the frame is a vertical packing-box E, for receiving the cotton to be pressed by the follower-block F. Under the box E is placed an ordinary baling-box with side doors. The follower F is connected above with the toggles G G, the outer ends of which are pivoted to the upper ends of the double lever-arms H H, which are strong upright beams on opposite sides of the press that have their fulcra $m\ m$ at the base thereof. On the upper ends of the double lever H H are also connected the pulleys or sheaves $a\ a$, around which is passed a rope, $b$, both ends of which are wound around drums $c\ c$ in opposite directions, the rope $b$ being fastened in the middle to a cross-bar, $d$, fig. 3, below the drums $c\ c$, so that when the drums rotate the rope $b$ shall wind up and draw the arms H H of the double lever together, and by means of the toggles G G connected therewith, force the follower-block F down into the packing-box E to press the cotton therein. Iron will be employed for the joints and wearing parts. The drums $c\ c$ are in the same shaft as another drum $e$, fig. 2, which is operated by a capstan, I, worked either by horse or manual power, with two connecting-ropes $g\ g$, that are so arranged as to wind up alternately on the capstan I and the drum $e$, as the motion of the capstan is reversed in its rotation. The follower-block F is also suspended by a hoisting-rope, $h$, to a drum, $k$, on the same shaft with the drums $e$ and $c\ c$, for the purpose of raising the follower F in the packing-box E after a bale has been pressed, by reversing the motion of the capstan I. It will be seen that by this arrangement, when the upper ends of the double lever H H have been expanded fully and the follower-block F has been lifted up above the packing-box E, the cotton to be pressed may be placed therein; then, by turning the capstan I in one direction the rope $b$ will be wound upon the drums $c\ c$ and draw the double lever-arms H H together, thereby by means of the toggles G G forcing the follower E down upon the cotton until it is pressed. By reversing the motion of the capstan the hoisting-rope $h$ is wound up in the drum $k$ and lifts the follower F again, as aforesaid.

Having described my invention, I claim as new, and desire to secure by Letters Patent—

The double lever H H, connected by toggles G G with the follower-block F, in combination with the capstan I, the drums $e$, $c\ c$, and $k$, and the hoisting-rope $h$, when employed in a baling-press, arranged and operating substantially as herein described.

The above specification of my invention signed by me this 7th day of January, 1867.

SAMUEL D. ROBERTS.

Witnesses:
 JOHN F. MORROGH,
 THÉODULE FONTENOT.